C. B. LITTLEFIELD.
Gas Cock.
No. 69,566.
Patented Oct. 8, 1867.
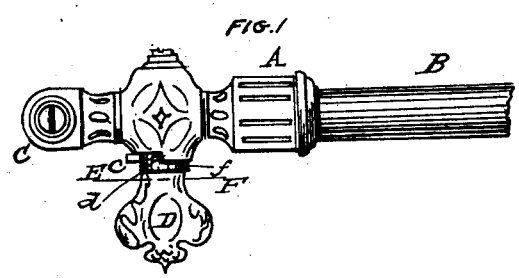
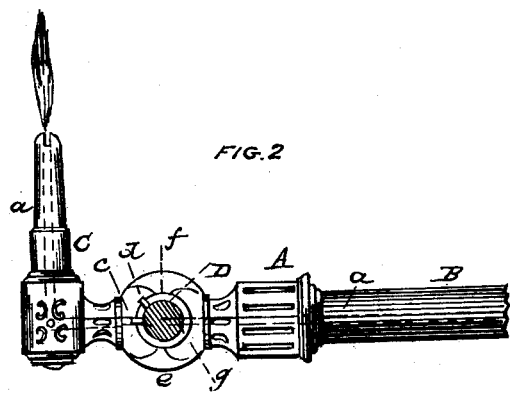
WITNESSES
INVENTOR

UNITED STATES PATENT OFFICE.

C. B. LITTLEFIELD, OF BOSTON, MASSACHUSETTS, ASSIGNOR TO HIMSELF AND T. W. PORTER, OF THE SAME PLACE.

IMPROVEMENT IN GAS-COCKS.

Specification forming part of Letters Patent No. 69,566, dated October 8, 1867.

*To all whom it may concern:*

Be it known that I, C. B. LITTLEFIELD, of Boston, in the county of Suffolk and State of Massachusetts, have invented a new and useful Improvement on Gas-Cocks; and I do hereby declare that the following is a full, clear, and exact description of the construction and operation of the same, reference being had to the accompanying drawings, making part of this specification, in which—

Figure 1 is a top view; and Fig. 2 is a side elevation, with the cock shown in vertical section on the line E F, Fig. 1.

Similar letters of reference indicate corresponding parts in the several figures.

The nature of my invention consists in constructing the gas-cock and joint in such manner that when opened to allow the escape of the gas, if the cock be then turned in one direction, it shuts the gas entirely off in the usual manner, while, if turned in the opposite direction, it cannot shut the gas entirely off, but allows a sufficient amount to escape to feed a diminished flame.

To enable others skilled in the art to make and use my invention, I will proceed to describe its construction and operation.

In the drawings, A represents the usual joint, in which the gas-cock D is fitted. B is the supply-pipe, and C is the burner.

The hole or passage for the gas through the pipe, joint, cock, and burner, when open or burning, is shown by the dotted lines $a\,a$, Fig. 2. $c$ is the usual cheek-pin, inserted in the cock. $f$ and $e$ are the stops, against either of which the pin $c$ is turned when the gas is shut off. In the joint here represented the stops $e$ and $f$ are at one hundred and eighty degrees from each other, while in others they are at ninety degrees, or one-fourth of the circle, from each other. In the former case the gas is at full flow when the cheek-pin is midway between the stops, but is entirely shut off when the cheek-pin is turned against either stop, while in the latter case the gas is at full flow when the pin is turned against one stop, but is entirely shut off when the pin is turned against the other stop. Thus, if the cock were turned so as to bring the pin $c$ against either the stop $e$ or $f$, the hole through the cock would not be in the direction of the axis of the hole through joint A, but would be at right angles thereto; but by turning the cock so that pin $c$ is in the position shown—to wit, equidistant between the stops or on the axis of the joint—then the hole through the cock is in line with that in the joint, and the gas flows freely through, while, if the stops were at ninety degrees from each other, or one at $e$ and the other at the joint now occupied by pin $c$, then, when the pin was turned against stop $e$, the gas would be shut off, but when turned against the other stop the gas would be at full flow.

In order to fit the cock D to the stops here shown, so that it may be turned in one direction to a stop, when opened, without fully shutting off the gas, I insert a pin, $d$, near to pin $c$, and at such point in the circumference of the cock as that, when this pin $d$ is turned against stop $f$, the hole through the cock will be in the direction shown by the dotted lines $g$ in Fig. 2, which admits the escape to the burner of a quantity of gas sufficient to feed a small and diminished flame.

Another method of arriving at the same result would be to form one of the stops at $e$ and the other at such point upon the circles between the position shown for pin $c$ and stop $f$ as that, when pin $c$ is turned against it, it will allow the escape of the required limited or reduced amount of gas, while, by turning the pin against the other stop at $e$, the gas would be entirely shut off.

In the alteration of burners in use to this method, in those in which the stops are at one hundred and eighty degrees from each other the auxiliary pin can be employed, while in those in which the stops are at ninety degrees from each other the adjusting one stop at between ninety and one hundred and eighty degrees from the other will give the same result; and in the new manufacture of this invention either method may be employed.

A great variety of devices may be employed to produce the same result, the above being enumerated as among the most feasible and inexpensive, while indexes or other indicators may be used, for the purpose of regulating the required diminution of light; but I do not intend to limit my claims to any particular method or methods of producing the result sought.

This adjustment or check is especially useful upon lights which are required to burn constantly, but are used only occasionally, and which, to economize gas, are turned nearly off when not in use, and if hurriedly done, or when being turned on, are liable to be extinguished, to the inconvenience of those requiring the light.

In this invention the trifling cost, if any, is largely counterbalanced by the increased convenience and utility.

Having thus described my invention, what I claim as new, and desire to secure by Letters Patent, is—

A gas-cock, D, and joint A, so constructed and arranged that when the cock D, being open, is turned to a stop in one direction it will shut the gas entirely off, but when turned to a stop in the opposite direction will nearly, but not entirely, shut off the gas.

C. B. LITTLEFIELD.

Witnesses:
T. W. PORTER,
STEPHEN C. PERRIN.